United States Patent [19]  
Vajda et al.

[11] Patent Number: 4,493,853  
[45] Date of Patent: Jan. 15, 1985

[54] CHOCOLATE PRODUCTS WITH INCREASED PROTEIN CONTENT AND PROCESS FOR THE PRODUCTION OF SUCH TYPE PRODUCTS

[75] Inventors: Gábor Vajda; László Ravasz; Béla Karácsonyi; Gábor Tabajdi, all of Budapest, Hungary

[73] Assignee: Központi Váltó- és Hitelbank RT. Innovációs Alap, Budapest, Hungary

[21] Appl. No.: 462,726

[22] Filed: Jan. 31, 1983

[30] Foreign Application Priority Data

Feb. 1, 1982 [HU] Hungary ................. 289/82

[51] Int. Cl.$^3$ ................. A23G 1/00
[52] U.S. Cl. ................. 426/582; 426/660; 426/613; 426/810
[58] Field of Search ............ 426/660, 582, 810, 613

[56] References Cited

U.S. PATENT DOCUMENTS

| | | | |
|---|---|---|---|
| 456,903 | 7/1891 | Ordway | 426/660 |
| 1,678,167 | 7/1928 | Robinson | 426/582 |
| 1,735,510 | 11/1929 | Shostak | 426/582 |
| 2,863,772 | 12/1958 | Kempf | 426/660 |
| 3,730,735 | 5/1973 | Rash et al. | 426/660 |
| 3,901,977 | 8/1975 | Rebane | 426/810 |
| 4,364,967 | 12/1982 | Black | 426/660 |

Primary Examiner—Jeanette M. Hunter  
Attorney, Agent, or Firm—Gabriel P. Katona

[57] ABSTRACT

A chocolate product with increased protein content and having decreased carbohydrate content is disclosed. The product comprises substantially of a processed cheese and chocolate melt made perfectly homogeneous in a weight ratio of 1:1–1,5, being solid or semi-solid at environmental temperature. The carbohydrate content of the chocolate is partially replaced by decomposed milk or cheese protein. This product is manufactured by mixing melted cheese with a chocolate melt at 50° C. or higher temperature by intensive stirring and homogenizing the mass, which is allowed to solidify preferably after it is formed. The formed product can be immersed into chocolate to obtain a chocolate icing on the surface of the product.

12 Claims, No Drawings

CHOCOLATE PRODUCTS WITH INCREASED PROTEIN CONTENT AND PROCESS FOR THE PRODUCTION OF SUCH TYPE PRODUCTS

SUMMARY OF THE INVENTION

This invention relates to chocolate products with increased protein content and to a process for the manufacturing of such type chocolate products to increase the assortment of products of the sweet industry.

BACKGROUND AND PRIOR ART

It is well-known, that among the products of the sweet industry, chocolates and products containing purely chocolate, are the most favourable. Depending on the kind of the chocolate it contains 40–60 weight % carbohydrate whereas the carbohydrate content of the products of the sweet industry with chocolate-content or chocolate icing is still even greater as mentioned. Chocolates contain in addition to carbohydrate alkaloids as well e.g. theobromine, tannin-derivatives cocoared and catechine, further mineral substances, which are physiologically useful and easily digestible.

Many experiments were made to increase the protein and to reduce the carbohydrate content of chocolates maintaining at the same time their deliciousness. These experiments, however, failed and therefore the proportion of the protein could not be increased at the expense of the carbohydrate. Chocolates form a heterogenous, polydisperse system, which contains sugar dispersed in cocoa-butter, cocoa-starch and other solid components, e.g. mineral substances. The cocoa-butter—as dispersing medium—is solid at room-temperature. The viscosity of the dispersing medium depends on the proportion of the cocoa-butter at a given temperature, as well as on the quantity of additives which reduce the viscosity of the product. Chocolate has a lyophobic character and cannot absorb more than 2–3 weight % of water, The homogeneity of the chocolate mass is destroyed, if it contains more than 5 weight % of water. Under influence of the water the sugar content of the chocolate dissolves and the formed sugar syrup is not able to redisperse in the dispersing medium, which is the cocoa-butter. Consequently small water- and fat droplets form within the originally homogeneous chocolate mass at 32° C. The unhomogeneous chocolate mass cannot be processed further and it becomes lumpy. This is the reason why chocolates could be enriched, or mixed respectively, with anhydrous substances or substances only containing very small water e.g. dried milk, roasted and milled seeds. This is the method which is suitable to produce milk-chocolate, and whole-nut-chocolate. If chocolate is mixed with substances having great water content, than this water content should be eliminated by heating during the refining process. If the water content of the chocolate is greater than the usual amount, the substance becomes lumpy and tastes gritty.

For flavouring the products of the dairy industry small quantity of chocolate are used some times, these products, however, have a taste and consistency of milk-products. For example, chocolate with milk, and quark (cottage cheese) products with chocolate icing, to.

DETAILED DESCRIPTION OF THE INVENTION

This invention relates to a novel chocolate product and to a process for producing a new chocolate-product wherein the chocolate character dominates and at the same time it is delicious with increased protein and reduced in carbohydrate content.

It was recognized that molten chocolate contacted with processed cheese, can be homogenized and the yielded product has a great deliciousness and a pleasant taste. The chocolate product, according to the invention, which is rich in protein and reduced in carbohydrate content can be characterized by consisting essentially of homogeneous mixture of processed cheese and chocolate at a weight ratio of 1:1–1.5, having a chocolate character, forming solid or semisolid consistency at room temperature and containing dipeptides, peptides, amino acids and sodium caseinate characteristic of cheese protein at the expense of the carbohydrate content.

The process for the preparation of the chocolate products with increased protein content according to the invention which comprises mixing a processed cheese preferably at a temperature of 50° C. or even higher temperature with a molten chocolate, cocoa mass or plain chocolate,—which may contain in given case an emulsifier as well—advantagously by intensive stirring, and after homogenizing it and if desired after shaping it is kept to solidify and in given case the shaped product is immersed into chocolate or into plain chocolate. The melting of the mass is performed as quickly as possible. The components contacted are cooled while stirring and thereafter with the help of a freezing apparatus the homogenized mass is solidified at $-10°$ C. or even at a lower temperature.

According to an alternative process the homogenized components are kept to cool. The ratio of the processed cheese and chocolate melt may be adjusted in a way to form a homogeneous mass at a given temperature. Selecting a proper proportion of the processed cheese and chocolate melt e.g. to 1:1.5 weight ratio, the homegeneity of the final product may be attained. However it may be deviated from the mentioned weight ratio, as well as in relation to the processed cheese and the chocolate melt. The chocolate, or the cocoa mass may contain 0.1–2.0 weight % emulsifiers acceptable in the food industry e.g. diglycerides or lecithin.

The chocolate component can be eating chocolate, milk chocolate, bitter chocolate, cocoa mass or chocolate icing, which is made from powdered cocoa, sugar and fats similar to cocoa-butter. Also the chocolate component can be white chocolate which is composed of cocoa-butter and sugar. The processed cheese can be of different basic material e.g. hard cheese, semi-hard cheese and/or soft cheese, which is processed with emulsifying salts used generally in the dairy industry. Cheeses with great dry matter content, e.g. cheeses with over 46 weight % dry matter content are preferred. The amount of the emulsifying salt based on the cheese material, can be 1 to 4 weight %. If, however processed cheese are used, then the amount of the emulsifying salt can be reduced. The suitable emulsifying salt or mixture of emulsifiing salts respectively are the following: citrate, disodium-hydrogen-phosphate, monosodium phosphate, neutral pyrophosphate, polyphosphate, mon-ortho-diorthophosphate, neutral-acidic pyrophosphate, orthophosphate+pyrophosphate, orthophosphate+polyphosphate, pyrophosphate+polyphosphate, ortho-pyro+polyphosphate, ortho-pyro+-polyphosphate+citrate/ Joha S4, Joha S4SS, Joha S9, Joha S 90, Joha 8, Joha P2, Joha T, Joha K, Solva 42, 62,70,82,85,100/. The proper pH-value of the mixture from the selected cheese material and emulsifier salt can be determined by a pilot processing. For adjustment of pH-value citric acid and/or citrate can be used also. The pH-value of the processing should be regulated so, that during the pilot processing fat or water separation does not occur. It is suitable, to adjust the pH-value of the processed cheese between 5 to 7. The softening of the melt can be effected in given case with honey (nectar of flowers) or with starch syrup. Before forming the homogenized mass, spice-extracts natural and synthetic flavouring substance (e.g. sweet orange oil) acids, eg. lactic acid, citric acid or tartaric acid or granulous enriching material e.g. sweetened fruits or vegetables can be added to the mass.

Chocolate can be replaced partly by nougat or nougatlike substance. The cheese material, if desired, can be enriched with other concentrated milk protein products. Such a product may contain e.g. 75 weight % of milk protein, 12 weight % of lactose and 8 weight % of milk minerals. Sodium caseinate is an example of such a product.

The chocolate mass produced can be poured into moulds which are also furnished with rodlet and are sold immersed in natural chocolate as suckers and lollipops.

It was recognized that the lipophobic chocolate can be homogenized, if the chocolate melt is mixed at a temperature of 50° C. with processed cheese, which may contain even 54% of moisture content, said mixing is performed gradually in equal proportions and at the end the chocolate mass forms a homogeneous mass with the cheese. Structurally, the cheese is originally of gel formation character which easily transforms into sol structure under influence of temperature. The gel textured cheese, if even in small pieces, cannot be homogenized with chocolate. The reasons are mentioned in the introductory part of this specification. Likewise, the cheese when heated and transformed into sol cannot be homogenized, if it is added to chocolate mass or chocolate melt, respectively, at a lower temperature than 50° C. The liquid mass separates into fat and water droplets, however, during the solidifying it become unhomogeneous the consistency at tasting is very grainy, and gritty.

Attempts have been made to prepare chocolate in which solid pieces of cheese are dispersed. Conventional natural cheese or processed cheese and other goods comprised mainly of cheese have, however, very bad preservation properties and are subjected to the appearance of mold and the liberation of fats in a short time. Therefore, when pieces of cheese cut to adequate size are incorporated into chocolate, a so called oil-blooming phenomenon occurs, wherein white lines or greasy spots of fat, derived from the mixed melting of fat, liberated from the surface of the cheese with cocoa oil of the chocolate, appear. At the same time a so-called sugar-blooming phenomenon occurs as well, wherein the sugar contained in chocolate is dissolved into the water liberated from the cheese, the water is vaporized, then the sugar crystallizes on the surface of the chocolate. Due to this phenomenon, the volume of the cheese contained in the chocolate decreases, spaces between cheese and the chocolate are formed, and mold may grow in the spaces.

Owing to these phenomena water and the oil in the cheese is diminished, the balance of amount of components in the cheese is destroyed and the cheese hardens and has a bad taste when eating. The disadvantages mentioned hinder the production of chocolate which contain solid cheese. According to the invention however a homogenized mass can be prepared, preferably, at a temperature higher than 50° C., which can be solidified after homogenization. Thereby the protein content of the chocolate product, according to this invention, can be enriched up to 20%, which means a significant high protein content, as compared to the customary chocolate products, which contain at most 6-7 weight % protein. The increase of the protein content of the chocolate products, according to this invention, is related to kind of protein employed, that is cheese protein—comparing it to other milk proteins which already contain the casein partly in a decomposed state. Partly the dipeptide, peptides and amino acids present, partly the non-decomposed casein, which instead of calcium is bound to sodium, provide those structural CHARACTERISTIC, which contribute to the advantages of the chocolate products of this invention. These products are able to bind different additives, which can be easily digested on eating the products.

The content of the cheese protein in the chocolate product, according to this invention can be determined on basis of the relative casein content. The principle of this method is, that the rate of the all-nitrogen contained substances in the cheese solution should be compared with the nitrogen content obtained by precipitation with alum, tested by the method of Kjeldahl. This method is described by the authors Schulz and Mrowetz Deutsche Molkerei Ztg. 73, 18, 495, (1952). Likewise, also can be used for the determination of the rate of the protein breakdown product in the cheese protein, a determination of the so called "formoltiter".

According to this method, the test material is titrated with sodium hydroxide of 0.1 normality, using phenophtalein indicator, thereafter formaldehyde solution is added and is titrated up to the pH-value of 8.3. Thus the formoltiter of the test material can be obtained, which should be calculated on the solids-non-fat (s.n.f.) content of the test calculated material. During the cheese ripening, as a result of protein (casein) breakdown, the amount of the free amino groups is increased and therefore the formoltiter value of the cheese or processed cheese increases as well.

The advantages of the process according to the invention, can be summarized as follows:
1. A chocolate product can be manufactured with increased protein content having high nutrition value and the product meets the requirements of the modern nourishment.
2. The assortment of sweet industry products can be implemented by means of products having new composition, agreable consistency and novel flavour effect.
3. The carbohydrate content of the chocolate, according to this invention, can be decreased advantageously in favor of the protein content.
4. The products produced with cocoa mass contain no sugar, therefore it can be consumed as diabetic product too.
5. It is possible to utilize processed cheese for sweet industry purposes.

EXAMPLES

The invention will now be more fully described in a number of examples which are given by way of illustration and not of limitation.

EXAMPLE 1

150 g of bitter chocolate was melted by stirring. Its temperature is adjusted by slow warming to 55°–60° C. Separately from the chocolate melt 150 g of semi-hard cheese is processed by adding into 1.2 weight % of Solva 85 emulsifying salt. The quality and amount of the emulsifying salt is determined by a pilot processing. During the processing of the cheese the temperature was raised to 80°–85° C. and was stirred, then while stirring the melt during cooling the bitter chocolate melt was added which was prepared in a separate vessel. Both components were homogenized at 55° C. by stirring and then formed. Thereafter is was rapidly solidified by means of a freezing apparatus at −10° C. or even at lower temperature. The product was removed from the mould and immersed into chocolate or plain chocolate mass for covering the surface thereof.

EXAMPLE 2

200 g of eating chocolate having customary quality was melted and warmed to 55°–60° C. In a separate vessel to 150 g of processed cheese, 0.5 weight % of Joha T emulsifying salt was added, then processed at 80°–85° C. The quality of the emulsifying salt is determined by a pilot processing. The processed cheese is mixed into the melted eating chocolate at 60° C., to which previously was added 0.2 weight % of monoglyceride emulsifyer. To the homogenized mass granulous sweetened fruit or vegetables, was added in warm-state then the corpus was solidified. The product removed from the mould was immersed into chocolate, and the covered product was then packed.

EXAMPLE 3

250 g of milk chocolate was melted, then heated to 55° C. and calculated on its weight 2.20% lecithin was incorporated into the melt. In separate vessel to 125 g of a mixture consisting of semi-hard cheese and processed cheese 1.4% of di- and poly-phosphate emulsifying salt mixture was added. The cheese processed at 80° C. temperature, then it was adjusted with disodium citrate to pH-value of 7.0. It was incorporated into the chocolate melt, then formed in melt form. The formed material was furnished with a lolly and at −15° C. temperature it was solidified by means of a freezing apparatus. From the mould the product was removed and immersed into chocolate, then the covered product was packed.

EXAMPLE 4

180 g of cocoa mass was melted, then heated to 60° C. A mixture of mono-diglyceride 0.6 weight % calculated on the mass was added. In a separate vessel 300 g of semi-hard cheese was prepared and processed, then after processing the pH-value was adjusted to 6.5, 2.5 weight % of Joha S9 emulsifying salt was added, then it was processed. The processed cheese was mixed into the melted cocoa mass and was sweetened with fructose. In place of fructose also sorbite and artificial sweeting agent can be used. The mass was formed then solidified while freezing. The product removed from the mould was immersed into natural or diabetic chocolate and the covered product was packed.

EXAMPLE 5

A mass consisting of 100 g of powdered cocoa, sugar and fat similar to cocoa-butter was heated to 55° C. Calculated on its weight 1% emulsifier was added to it. In separate vessel 100 g of cheese was processed with 1.5% of emulsifying salt, thereafter the components were homogenized in a heated state then it was filled into a mould and was allowed to solidify.

EXAMPLE 6

The process of example 1 was repeated with the difference, that to the processed cheese, 20% of milk protein concentrate was added. This concentrate contains 75% of protein, 12% of lactose, 8% of milk minerals and 5% of water.

EXAMPLE 7

100 g of a mass prepared from powdered cocoa, sugar, cream, and butter, was heated to 60° C. and 1.2% of emulsifier was added. To this melt 100 g processed cheese was added, then the mass was homogenized, formed, and finally solidified.

We claim:
1. A process for the preparation of a chocolate product with increased protein content, which comprises the steps of:
   (a) melting and processing cheese,
   (b) mixing said melted processed cheese with a quickly melted chocolate melt in a ratio of 1:1–1.5,
   (c) homogenizing the resulting mass with vigorous stirring at 50 degrees Centigrade or higher,
   (d) optionally adding granulous substance to said homogenized mass,
   (e) allowing the homogenized mass rapidly to solidify to a product, and
   (f) finally immersing the product in chocolate or plain chocolate mass.
2. The process of claim 1, wherein the cheese is processed with emulsifying salt or salts.
3. The process of claim 1, wherein the chocolate used is cocoa mass or plain chocolate.
4. The process of claim 1 or 3, wherein the chocolate melt or the cocoa mass further contains 1 to 2 weight o/o of an emulsifier.
5. The process of claim 1, wherein the chocolate used is, white chocolate, bitter chocolate, milk chocolate, or a mixture of powdered cocoa, sugar and fat similar to cocoa-butter.
6. The process of claim 5, wherein the chocolate is partially replaced by nougat or nougat like mass and/or the cocoa is partially replaced by roasted and milled Saint John's bread.
7. The process of claim 1, wherein the cheese used contains 10 to 35 weight o/O of milk protein concentrate.
8. The process of claim 1, wherein the cheese used is processed, hard, semi-hard and/or soft.
9. The process of claim 2, wherein the amount of emulsifying salts is 0.5 or 1–4 weight O/O and which is calculated on the basis of the amount of the cheese.
10. The process of claim 1, wherein the pH is adjusted so that the pH of the cheese is identical to the pH of the chocolate.
11. The process of claim 1 or 3, wherein the chocolate or cocoa mass further contains granulous artificial sweetening agents and/or fructose or sorbite.
12. A chocolate product with increased protein content and decreased carbohydrate content, comprising a thoroughly homogeneous mixture of a processed cheese and chocolate melt in a weight ratio of 1:1–1.5, and having a solid, or semi-solid consistency at room temperature, and wherein the carbohydrate content of the chocolate is partially replaced by dipeptides, peptides, amino acids and sodium caseinate containing decomposed milk protein and cheese protein.

* * * * *